A. BATAILLE.
Gridirons.

No. 136,955.

Patented March 18, 1873.

Witnesses
Chas H Smith
Geo. D. Walker

Inventor
Achille Bataille
Lemuel W. Serrell
atty.

UNITED STATES PATENT OFFICE.

ACHILLE BATAILLE, OF NEW YORK, N. Y.

IMPROVEMENT IN GRIDIRONS.

Specification forming part of Letters Patent No. 136,955, dated March 18, 1873.

*To all whom it may concern:*

Be it known that I, ACHILLE BATAILLE, of the city and State of New York, have invented Improvements in Gridirons, of which the following is a specification:

Gridirons have been made of ranges of parallel wires united together at their ends by transverse wires or bars, and these have been hinged together in pairs so as to clamp the meat or other material to be cooked and allow of the same being reversed. The hinges employed in such gridirons have usually been wire rings or hooks. The heat softens the wire, and the hooks or rings are liable to become misplaced or entangled in handling the hot gridiron with rapidity, and hence the hinges give out, bend, or break, and the gridiron becomes useless.

My present invention is made for preventing injury to the hinges under the circumstances that they are exposed to in use, hence rendering the gridiron more durable and serviceable.

I make use of parallel wires with the connecting bars or wires, as heretofore, but the halves of the gridiron are made with two or more loops formed by the parallel wires, and the loops project beyond the transverse wires and are connected by metallic straps forming the hinges. These are very strong and durable, and are not liable to be bent or broken.

Figure 3:
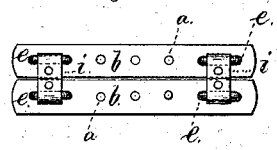
Figure 2:
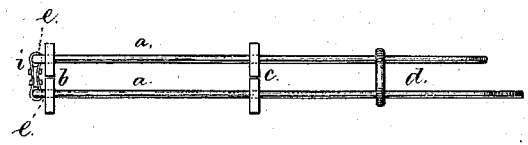
Figure 1:
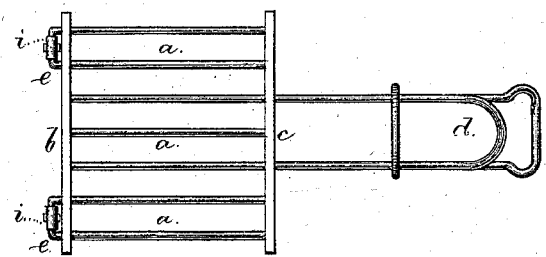

In the drawing, Figure 1 is a plan of the gridiron complete. Fig. 2 is a side view; and Fig. 3 is an elevation of the back edge.

The parallel wires $a$ and transverse wires or bars $b$ $c$ and handles $d$ are of usual character, except that in each half of the gridiron there are two or more pairs of the bars $a$ made double or from one piece of wire, and inserted so as to form loops $e$ $e$, that project from the back of the bar $b$. Around these loops $e$ $e$ are the metallic straps $i$ $i$ forming the hinges. It is preferable to make these hinges of a strip of wrought metal bent up, as shown, and riveted together near the middle, the loops $e$ passing through the openings formed at the ends of said straps. Where the parallel bars are at a greater distance apart than the width of the plate-hinge the loops for the same may be at the ends of two of the parallel wires in each half of the gridiron, the loops being made by a double bend, the ends of the wires being passed back through the bars $b$ and riveted.

I claim as my invention—

The gridiron made with the loops $e$ at the back of the bar $b$ of the wire forming two of the parallel bars $a$ $a$, and said loops being united by the metallic straps $i$ $i$ forming the hinges, as set forth.

Signed by me this 11th day of February, A. D. 1873.

ACHILLE BATAILLE.

Witnesses:
 GEO. T. PINCKNEY,
 CHAS. H. SMITH.